US011433870B2

(12) United States Patent
Block et al.

(10) Patent No.: US 11,433,870 B2
(45) Date of Patent: Sep. 6, 2022

(54) METHOD FOR CONTROL AND/OR REGULATION OF A HYBRID POWERTRAIN OF A MOTOR VEHICLE WITH AN EXHAUST GAS RECIRCULATION SYSTEM

(71) Applicant: Volkswagen Aktiengesellschaft, Wolfsburg (DE)

(72) Inventors: Gerald Block, Lehre (DE); Kerstin Brandes, Wendeburg (DE); Andreas Grote, Wendeburg (DE); Christian Maas, Schwuelper (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 412 days.

(21) Appl. No.: 16/691,023

(22) Filed: Nov. 21, 2019

(65) Prior Publication Data

US 2020/0164857 A1 May 28, 2020

(30) Foreign Application Priority Data

Nov. 22, 2018 (DE) ...................... 10 2018 220 091.2

(51) Int. Cl.
| | | |
|---|---|---|
| *B60W 20/10* | (2016.01) | |
| *F02M 26/00* | (2016.01) | |
| *B60W 10/02* | (2006.01) | |
| *B60W 10/06* | (2006.01) | |
| *B60W 10/08* | (2006.01) | |
| *B60W 30/19* | (2012.01) | |
| *F02D 41/04* | (2006.01) | |

(52) U.S. Cl.
CPC ............ *B60W 20/10* (2013.01); *B60W 10/02* (2013.01); *B60W 10/06* (2013.01); *B60W 10/08* (2013.01); *B60W 30/19* (2013.01); *F02D 41/045* (2013.01); *F02M 26/00* (2016.02); *F02D 2250/21* (2013.01); *F02M 2026/001* (2016.02)

(58) Field of Classification Search
None
See application file for complete search history.

(56) References Cited

U.S. PATENT DOCUMENTS

| | | | | |
|---|---|---|---|---|
| 6,425,365 B1 * | 7/2002 | Peters | ................. | F02D 41/0055 123/198 DB |
| 6,519,513 B2 * | 2/2003 | Nakagawa | ............ | B60W 10/02 903/917 |
| 7,726,118 B2 * | 6/2010 | Oberski | ................. | F01N 3/206 60/303 |
| 8,961,368 B2 * | 2/2015 | Glugla | ................ | F02B 29/0468 477/110 |
| 9,376,965 B2 * | 6/2016 | Whitney | ............ | F02D 41/0002 |
| 9,399,459 B2 * | 7/2016 | Glugla | .................. | B60W 20/15 |
| 9,447,742 B2 * | 9/2016 | Styles | .................... | F02M 26/43 |
| 9,587,540 B2 * | 3/2017 | Eckhoff | .................. | F01N 3/103 |
| 9,714,026 B2 * | 7/2017 | Kanno | .................. | B60W 10/08 |
| 9,856,829 B2 * | 1/2018 | Leone | ................... | F02D 41/123 |
| 9,925,974 B2 * | 3/2018 | Leone | ................. | F02D 41/0087 |
| 10,294,874 B2 * | 5/2019 | Styles | ................. | F02D 41/0065 |
| 10,632,990 B2 * | 4/2020 | Legner | ................. | B60W 20/40 |
| 11,118,519 B2 * | 9/2021 | Lee | ..................... | F02N 11/0829 |
| 2002/0123831 A1 * | 9/2002 | Nakagawa | .......... | F02N 11/0814 903/917 |
| 2008/0066452 A1 * | 3/2008 | Oberski | ............ | B01D 53/9431 60/281 |
| 2014/0100074 A1 * | 4/2014 | Glugla | ................ | F02D 41/0005 477/3 |
| 2014/0123630 A1 * | 5/2014 | Eckhoff | ................ | F01N 3/2006 60/297 |
| 2014/0316681 A1 * | 10/2014 | Whitney | ............ | F02M 25/0809 701/108 |
| 2015/0025723 A1 * | 1/2015 | Glugla | .................. | B60W 20/15 180/65.265 |
| 2015/0057911 A1 * | 2/2015 | Wooldridge | ........... | F02M 26/06 701/108 |
| 2015/0136074 A1 * | 5/2015 | Styles | ................. | F02D 41/0055 123/320 |
| 2015/0136076 A1 * | 5/2015 | Styles | ................... | F02D 41/042 123/325 |
| 2016/0264125 A1 * | 9/2016 | Kanno | .................. | B60W 10/26 |
| 2017/0305411 A1 * | 10/2017 | Leone | ..................... | F02D 21/08 |
| 2017/0306893 A1 * | 10/2017 | Leone | .................... | F02D 41/064 |

(Continued)

FOREIGN PATENT DOCUMENTS

| | | | | |
|---|---|---|---|---|
| CN | 1895941 A | | 1/2007 | |
| CN | 104290774 A | | 1/2015 | |
| CN | 104653313 A | * | 5/2015 | ............ B60W 20/00 |
| CN | 104653314 A | * | 5/2015 | ............... B60K 6/00 |
| CN | 104653313 B | * | 5/2019 | ............ B60W 20/00 |
| CN | 111287855 A | * | 6/2020 | ............ B60W 10/02 |
| CN | 104653314 B | * | 2/2021 | ............... B60K 6/00 |

(Continued)

OTHER PUBLICATIONS

Chinese Office Action dated Nov. 24, 2021 in corresponding application 201911151839.4.

*Primary Examiner* — Kevin R Steckbauer

(74) *Attorney, Agent, or Firm* — Muncy, Geissler, Olds & Lowe, P.C.

(57) ABSTRACT

A method for control and/or regulation of a hybrid powertrain of a motor vehicle, wherein exhaust gas is taken from an exhaust system and delivered to a fresh air supply of an internal combustion engine, wherein the residual recirculated exhaust gas is purged from the fresh air supply in the event of a negative load jump. After the negative load jump, the internal combustion engine continues to run with a smaller load and simultaneously the torque supplied by the internal combustion engine is recuperated by means of the electric machine, wherein no positive torque in total is applied to the output of the powertrain.

6 Claims, No Drawings

(56) References Cited

U.S. PATENT DOCUMENTS

| | | | |
|---|---|---|---|
| 2018/0229717 A1* | 8/2018 | Legner | B60K 6/12 |
| 2020/0164857 A1* | 5/2020 | Block | F02D 41/005 |
| 2020/0173381 A1* | 6/2020 | Lee | B60W 10/02 |

FOREIGN PATENT DOCUMENTS

| | | | | |
|---|---|---|---|---|
| DE | 101 51 502 A1 | 4/2003 | | |
| DE | 10 2007 044 221 A1 | 3/2008 | | |
| DE | 10 2011 107 692 B3 | 1/2013 | | |
| DE | 10 2013 111 112 A1 | 4/2014 | | |
| DE | 10 2014 105 278 A1 | 10/2014 | | |
| DE | 102014223067 A1 * | 5/2015 | | B60K 6/00 |
| DE | 102014223089 A1 * | 5/2015 | | B60W 20/00 |
| DE | 102015215818 A1 | 2/2017 | | |
| DE | 10 2017 108 739 A1 | 10/2017 | | |
| DE | 10 2016 211 528 A1 | 12/2017 | | |
| DE | 102016211528 A1 * | 12/2017 | | B60K 6/20 |
| DE | 102018220091 A1 * | 5/2020 | | B60W 10/02 |
| EP | 3 382 1285 A1 | 10/2018 | | |
| EP | 3656594 A1 * | 5/2020 | | B60W 10/02 |
| KR | 102204543 B1 * | 1/2021 | | B60W 10/02 |
| RU | 2014145814 A * | 6/2016 | | B60W 20/00 |
| RU | 2014145814 A3 * | 6/2016 | | F02D 21/00 |
| RU | 2014145816 A * | 6/2016 | | B60K 6/00 |
| RU | 2014145816 A3 * | 6/2016 | | B60K 6/00 |

\* cited by examiner

METHOD FOR CONTROL AND/OR REGULATION OF A HYBRID POWERTRAIN OF A MOTOR VEHICLE WITH AN EXHAUST GAS RECIRCULATION SYSTEM

This nonprovisional application claims priority under 35 U.S.C. § 119(a) to German Patent Application No. 10 2018 220 091.2, which was filed in Germany on Nov. 22, 2018 and which is herein incorporated by reference.

BACKGROUND OF THE INVENTION

Field of the Invention

The present invention relates to a method for control and/or regulation of a hybrid powertrain of a motor vehicle, wherein exhaust gas is taken from an exhaust system and delivered to a fresh air supply of an internal combustion engine.

Description of the Background Art

An exhaust gas recirculation system represents a measure for improving the efficiency of the internal combustion engine, in particular of a gasoline engine. The exhaust gas recirculation system achieves results including that the caloric properties of the working process are positively influenced, and also the tendency to knock is reduced, which likewise contributes to a more efficient combustion process.

The hybrid powertrain additionally has at least one electric machine. The electric machine obtains electric energy from a battery when the electric machine is operating as an electric motor. When the electric machine is operating as an electric motor, the electric machine can assist the internal combustion engine during startup and acceleration. This makes possible a smaller and more fuel-efficient design of the internal combustion engine. The battery can be charged by the electric machine in that the electric machine operates as a generator while the internal combustion engine is providing the drive power or during braking.

From DE 10 2017 108 739 A1, which corresponds to U.S. Pat. No. 9,925,974, which is incorporated herein by reference, a hybrid powertrain having an internal combustion engine, an electric machine, and an exhaust gas recirculation system is known. In the corresponding method, a fuel supply of the internal combustion engine is now deactivated. In a subsequent process step, the internal combustion engine is spun without fuel supply for an additional 1 to 3 seconds by the electric machine in order to expedite the purging of residual recirculated exhaust gas in the intake manifold. As a result of fully opening an intake throttle during the spinning, exhaust residuals can be flushed out of the EGR system and the air induction system, and the air induction system can be replenished with fresh intake air. Flushing exhaust residuals out of the air induction system and EGR system makes it possible to avoid combustion stability issues during a subsequent restart of the internal combustion engine. The engine may be spun without fuel supply at a selected engine speed that is based on the engine speed before the fuel injectors were shut off. As an alternative, the selected engine speed can be a speed that is efficient both for the internal combustion engine and for the transmission. Accordingly, the purge time required to completely flush out the recirculated exhaust gases is a function of the internal combustion engine speed and a throttle position. In another example, the internal combustion engine can be spun without fuel supply at an internal combustion engine speed that corresponds to at least a cranking speed of the internal combustion engine. In addition to expediting the purging, this allows the internal combustion engine to be rapidly restarted in the event of an operator changing his mind, for example when the operator increases demanded internal combustion engine torque shortly after the internal combustion engine torque demand has fallen below the threshold. For example, in response to an indication of an operator's change of mind, the controller can start to supply fuel to the internal combustion engine and to spin up the internal combustion engine from the cranking speed in order to thus meet the operator's torque demand. In still other examples, the internal combustion engine may be spun without fuel supply at an internal combustion engine speed that allows the recirculated exhaust gases to be purged from the air intake tract as quickly as possible.

From DE 101 51 502 A1, which corresponds to U.S. Pat. No. 6,425,365, a method is known for controlling an internal combustion engine having multiple fuel injectors. A system for controlling fuel evaporation is present, including a vapor management valve between the fuel tank and an intake manifold and an EGR valve between the exhaust manifold and the intake manifold. The closing of the vapor management valve and EGR valve becomes a part of the engine shutdown routine in response to an engine shutdown command after the supply of fuel has been stopped, if it is ensured within an adjustable time that no undesirable residual fuel is present in the intake manifold. The internal combustion engine continues to be spun by a generator until the time that is to be adjusted has elapsed. This purge time is adjustable. The method uses a flag, "engine_running," that tells whether combustion is occurring or is being produced by the internal combustion engine torque. The flag is set to 0 in the engine shutdown routine when purging of the intake manifold is completed. If the "engine_running" flag is equal to 0, all timers and flags in the shutdown routine are reset, and the engine shutdown process is activated.

When the driver eases up on the accelerator, and consequently a negative load jump occurs, this means for the engine controller that the driver's torque demand jumps from full load to zero, for example. The internal combustion engine should thus stop delivering torque as soon as possible, which can be achieved by blanking-out injection and consequently preventing combustion. Under certain circumstances it is necessary, however, to allow the engine to continue running for a few cycles at a low load in order to avoid a negative load reversal or to limit undesirable temperature gradients of the exhaust gas in the exhaust system. This can lead to problems in this regard because, firstly, the EGR compatibility at low loads is considerably more limited than at high loads, and secondly, the recirculated exhaust gas is introduced into the intake path so that even in the case of immediate closing of the EGR valves, a certain number of working cycles is required before pure air, which is to say air with no EGR constituent, reaches the cylinders. Since the cylinders have less charge at low load, at the same time this means that the number of working cycles until the residual EGR gas has been flushed increases. A goal conflict therefore occurs, on the one hand to deliver as little torque from the internal combustion engine to the powertrain as possible, and on the other hand to be able to operate the internal combustion engine with at least enough load that it burns without misfiring at the existing EGR rate. The problem is exacerbated when additional fuel is injected into the EGR path. In this case, even immediate injection blank-out is not an option as a response to the driver's requirement, because fuel vapor would also be pumped unburned through the combustion chambers with the EGR and would react together with the air in the catalytic converter.

SUMMARY OF THE INVENTION

It is therefore an object of the present invention to improve the generic method.

According to an exemplary embodiment of the invention, the method is continued after the occurrence of a negative load jump by the means that, after the negative load jump, the internal combustion engine continues to run with a smaller load and simultaneously the torque supplied by the internal combustion engine is recuperated by means of the electric machine, wherein no positive torque in total is applied to the output of the powertrain. The internal combustion engine continues to run with a smaller load, which is required in order to convey the residual recirculated exhaust gases (EGR constituents) out of the intake system, wherein the torque supplied by the internal combustion engine is simultaneously recuperated by means of the electric machine. As a result, there is likewise no positive torque in total applied to the output of the powertrain. The output of the powertrain is composed of the driven wheels. It is possible to flush out the EGR constituents in this way without applying a positive torque to the driven wheels.

Furthermore, it is possible to additionally continue to operate the internal combustion engine at an efficiency-optimized load point and to utilize the electrical energy that is then additionally generated for subsequent acceleration or for electric range extension.

Furthermore, the possibility exists that the torque supplied by the internal combustion engine is overcompensated for by the electric machine in order to represent a braking frictional torque of an internal combustion engine coasting in gear that the driver expects in principle after releasing the accelerator. In total, this targeted control of the internal combustion engine and of the electric machine can lead to the problem of the EGR constituents that must be flushed being solved on the one hand, and on the other hand can achieve the result that the mechanical energy liberated in this process is temporarily stored in the form of electrical energy.

There are multiple possibilities for incorporating the electric machine into the powertrain. The electric machine can be arranged on the engine side of a clutch, wherein the clutch is opened after the negative load jump, wherein the electric machine recuperates the mechanical energy within the framework of speed regulation of the internal combustion engine.

A possibility for allowing the internal combustion engine to continue to run without delivering torque to the powertrain is the opening of a clutch between the internal combustion engine and a transmission, wherein in this case the electric machine recuperates the mechanical energy within the framework of speed regulation of the engine. In this embodiment, the electric machine is arranged on the engine side from the viewpoint of the clutch. In this design, no braking action on the powertrain by the electric machine is possible at all.

Furthermore, the electric machine can be arranged on a transmission side of the clutch, wherein the clutch is closed in the case of the negative load jump, and a negative torque is applied to the powertrain by means of the electric machine. This variant with closed clutch is preferred on account of the possibility of additionally applying negative torque to the powertrain.

This control strategy of the internal combustion engine and electric machine can be utilized for additional dynamic processes. One possibility here is a gear change. The negative load jump can occur in a hybrid powertrain with a manual transmission after the driver disengages the clutch to change gears, wherein the electric machine regulates the speed of the internal combustion engine. In the case of manual transmissions, the abovementioned negative load jump occurs when the driver eases up on the accelerator and disengages the clutch to change gears. In this case the speed of the internal combustion engine can be regulated by means of the electric machine in the event that it is not to be shut off immediately for one of the abovementioned reasons.

Furthermore, the negative load jump can occur in a hybrid powertrain with an automatic transmission, wherein the negative load jump occurs to protect the clutch, in particular in the case of shifting operations during acceleration. In the case of automatic transmissions, the torque of the internal combustion engine is briefly reduced to protect the clutch, in particular in the case of shifting operations during acceleration. This likewise represents a negative load jump. In gasoline engines this occurs in particular by means of injection blank-out, closing of the throttle, or an ignition-advance reduction. Injection blank-out is equivalent to the above-described shutoff of the engine with the associated potential problems, for which reason the proposed strategy should be used if necessary. In the case of an ignition-advance reduction, the efficiency of combustion is intentionally degraded. In some circumstances, it may be energetically more favorable to burn with an efficiency-optimized ignition timing and to electrically recuperate the excess energy. Since the internal combustion engine would also be under load during the shifting operation in this case, the torque would also be available immediately after the end of the shifting operation, which would not have been the case in a shifting operation with a closed throttle, for example.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. A method for control and/or regulation of a hybrid powertrain of a motor vehicle, the method comprising:
   taking exhaust gas from an exhaust system;
   delivering the exhaust gas to a fresh air supply of an internal combustion engine so as to provide recirculated exhaust gas to the internal combustion engine; and
   purging the residual recirculated exhaust gas from the fresh air supply in the event of a negative load jump;
   wherein, in order to purge the residual recirculated exhaust gas, the internal combustion engine continues to run with a smaller load after the negative load jump and substantially simultaneously the torque supplied by the internal combustion engine is recuperated via an electric machine so that no positive torque in total is applied to an output of the hybrid powertrain, and
   wherein the negative load jump occurs in the hybrid powertrain having a manual transmission when a driver disengages a clutch to change gears, and wherein the electric machine regulates a speed of the internal combustion engine.

2. The method according to claim 1, wherein the internal combustion engine continues to be operated at an efficiency-optimized load point after the negative load jump.

3. The method according to claim 1, wherein the torque supplied by the internal combustion engine is overcompensated for by the electric machine in order to represent to a driver a braking frictional torque of an internal combustion engine coasting in gear.

4. The method according to claim 1, wherein the electric machine is arranged on an engine side of the clutch, wherein the clutch is opened after the negative load jump, and wherein the electric machine recuperates mechanical energy within a framework of speed regulation of the internal combustion engine.

5. The method according to claim 1, wherein the electric machine is arranged on a transmission side of the clutch, wherein the clutch is closed in the case of the negative load jump, and a negative torque is applied to the hybrid powertrain via the electric machine.

6. A method for control and/or regulation of a hybrid powertrain of a motor vehicle, the method comprising:
   taking exhaust gas from an exhaust system;
   delivering the exhaust gas to a fresh air supply of an internal combustion engine so as to provide recirculated exhaust gas to the internal combustion engine; and
   purging the residual recirculated exhaust gas from the fresh air supply in the event of a negative load jump;
   wherein, in order to purge the residual recirculated exhaust gas, the internal combustion engine continues to run with a smaller load after the negative load jump and substantially simultaneously the torque supplied by the internal combustion engine is recuperated via an electric machine so that no positive torque in total is applied to an output of the hybrid powertrain, and
   wherein the negative load jump occurs in the hybrid powertrain having an automatic transmission, wherein the negative load jump occurs to protect a clutch in a case of shifting operations during acceleration.

\* \* \* \* \*